… … …

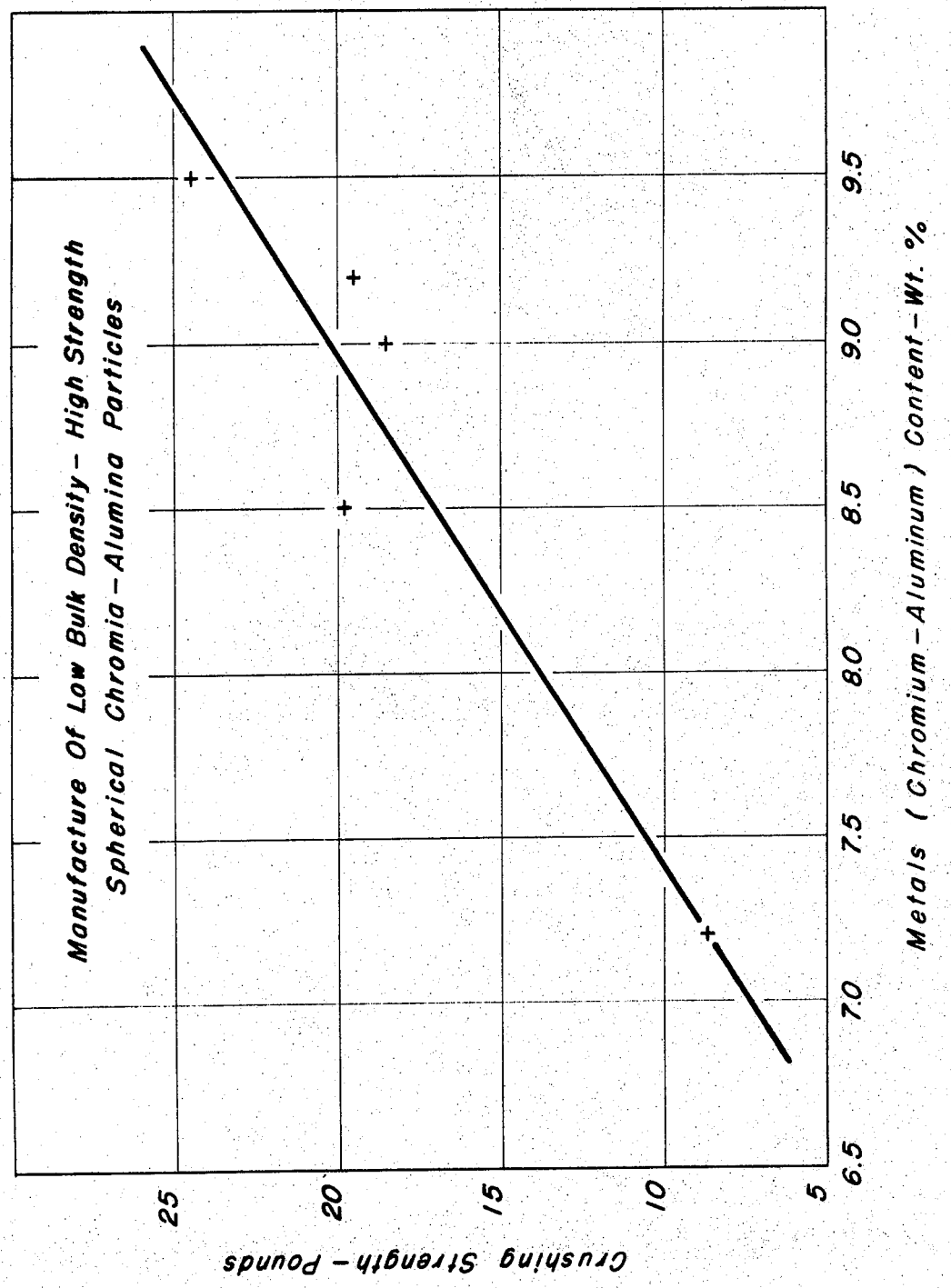

3,681,259
MANUFACTURE OF LOW BULK DENSITY-HIGH STRENGTH SPHERICAL CHROMIA-ALUMINA PARTICLES

Kenneth D. Vesely, Arlington Heights, Ill., assignor to Universal Oil Products Company, Des Plaines, Ill.
Filed Dec. 29, 1969, Ser. No. 888,562
Int. Cl. B01j 11/44
U.S. Cl. 252—448
7 Claims

ABSTRACT OF THE DISCLOSURE

Low density chromia-alumina gel spheres of improved crushing strength are prepared by the oil-drop method utilizing a dropping mixture comprising a chromia-alumina sol and hexamethylenetetramine, said dropping mixture having a metals/chloride weight ratio of from about 1:1 to about 1.5:1, a hexamethylenetetramine/chloride mole ratio of from about 1.1:4 to about 1.65:4 and a chromium-aluminum metals content of from about 7 to about 10 weight percent. After dropping, the spheres are pressure aged at a temperature of from about 240° to about 500° F. for a period of from about 1 to about 5 hours, and are then washed, dried and calcined.

---

Composites comprising chromia and alumina have been widely employed as catalysts, or as a component of catalysts, to effect a variety of reactions including the oxidation, dehydrogenation, and dehydrocyclization of hydrocarbons, and are of particular interest with respect to the conversion of various noxious components occurring in exhaust gases of internal combustion engines.

The various processes employing chromia-alumina composites as catalyst, or as a component thereof, generally comprise a fixed bed type of operation. This type of operation must frequently contend with variations in pressure drop across the bed, and with channeling of the reactant stream through the bed whereby a substantial portion of the catalyst is by-passed. These and other deficiencies of a fixed bed type of operation are substantially obviated by utilizing spheroidal catalyst particles which permit a more uniform packing of the catalyst bed.

Spheroidal chromia-alumina gel particles can be manufactured by the oil-drop method substantially as disclosed by J. Hoekstra in U.S. Pat. No. 2,620,314, with respect to the manufacture of spheroidal alumina particles, the sol starting material being in this instance an acidic chromia-alumina cosol. Briefly, the method comprises commingling the sol with a setting or gelling agent at below gelation temperature and dispersing the mixture as droplets into a water immiscible suspending medium, usually a gas oil, maintained at an elevated temperature whereby the sol droplets are formed into firm spherical gel particles. The particles are thereafter subjected to one or more aging treatments whereby certain desirable physical properties are imparted thereto.

Hexamethylenetetramine (HMT) in aqueous solution is described as a most suitable gelling agent having a strong buffering action at a pH of from about 4 to about 10 and a rate of hydrolysis which increases with temperature. Thus, the sol-HMT mixture is dispersed as droplets into the hot oil suspending medium maintained at a temperature effecting hydrolysis of the HMT and accelerating gellation of the sol into firm spherical gel particles. During the subsequent aging process, the HMT retained in the gel particles continues to hydrolyze to ammonia, carbon dioxide and miscellaneous amines, and to effect substantially complete neutralization of the acid anion (chloride). In view of the temperature limitations of conventional aging techniques, complete hydrolysis of the HMT is not achieved, and substantially complete neutralization of the acid anion requires the use of a substantial excess of aqueous HMT solution. Generally, a complete aging treatment comprises retaining the hydrogel spheres in the hot oil-suspending medium for an extended period to insure substantially complete neutralization thereof, and thereafter in an aqueous alkaline medium for a further extended period, and finally water-washing the shperes to remove soluble salts.

The problem with which the present invention is concerned arises when it is attempted to produce low bulk density spheroidal chromia-alumina gel particles, i.e., less than about 0.5 gram per cubic centimeter, and characterized by a high crushing strength, i.e., a crushing strength in excess of about 10 pounds. Chromia-alumina spheroidal particles of this description are particularly desirable for use in a catalytic converter for the treatment of exhaust gases emanating from an internal combustion engine. The described oil-drop method can be employed to manufacture chromia-alumina spheroidal gel particles of suitable low bulk density by certain disclosed process modifications. However, the product is substantially deficient in crushing strength. Thus, a two-stage aging process is disclosed which comprises an initial aging in the hot oil-suspending medium in the presence of HMT, and a subsequent aging in an ammonium hydroxide solution (liquid alkaline age). In the absence of the liquid alkaline age, high density spheres, i.e., in excess of about 0.7 gram per cubic centimeter, are produced.

It has been observed that the crushing strength of the chromia-alumina gel product is directly related to the metals (chromium-aluminum) content of the dropping mixture. However, due to the diluting effect of the relatively large volume of HMT solution required to effect the desirable degree of neutralization of the chromia-alumina sol, the metals content of the dropping mixture is substantially limited and, consequently, the crushing strength of the chromia-alumina spherical gel product prepared therefrom is also limited.

It is then an object of this invention to manufacture spheroidal chromia-alumina gel particles characterized by low bulk density coupled with high crushing strength. In one of its broad aspects, the present invention embodies a method for the manufacture of low density-high strength spherical chromia-alumina gel particles which comprises preparing a chromia-alumina sol characterized by a metals/chloride mole ratio of from about 1:1 to about 1.5:1; preparing a dropping mixture by commingling said sol with an aqueous HMT solution, the volume of said solution being sufficient to form a dropping mixture comprising from about 7 to about 10 wt. percent metals, and the HMT concentration of said dropping mixture being sufficient to provide an HMT/chloride mole ratio in said dropping mixture of from about 1.1:4 to about 1.65:4; dispersing the resulting dropping mixture as droplets into a water-immiscible suspending medium maintained at from about 120° to about 220° F. and retaining the droplets therein until they set to spherical gel particles; aging said gel particles and effecting substantially complete hydrolysis of the residual HMT contained therein at a temperature of from about 240 to about 500° F., and at a pressure to maintain the water content of said particles in a substantially liquid phase, and washing and thereafter drying and calcining the aged particles.

Other objects and embodiments of this invention will become apparent in the following detailed specifications.

Pursuant to the method of this invention, a chromia-alumina sol is initially prepared to comprise a metals/chloride weight ratio of from about 1:1 to about 1.5:1. Ratios other than those described effect premature gelation of the sol and/or the formation of hydrogel spheres which are too soft for further processing. The chromia-alumina hydrogel spheres, prepared as herein contemplated, tend to undergo less shrinkage during aging and drying as the metals/chloride ratio of the sol is increased. It is therefore desirable to maintain a relatively high ratio to obviate stress and strain in the hydrogel spheres resulting from excessive shrinkage.

The described chromia-alumina sol may be prepared in any conventional or otherwise convenient manner. For example, chromium trioxide is dissolved in aqueous hydrochloric acid in an amount corresponding to from about 0.2 to about 2.0 moles of hydrochloric acid per mole of chromium trioxide. The solution is thereafter admixed with formaldehyde as a reducing agent whereby a chromia sol comprising chromium in the +3 valence state is formed. The chromia sol is thereafter commingled with an alumina sol separately prepared, for example, by digesting aluminum in aqueous hydrochloric and/or aluminum chloride solution. The desired metals/chloride ratio is conveniently established at this stage, the metals, chromium and aluminum being in a predetermined ratio. An alternative method of sol preparation comprises digesting aluminum in an acidic chromium chloride solution, e.g., an aqueous chromium chloride solution. In any case, it has been found particularly advantageous to age the chromia and alumina sols together at below gelation temperature for a period of from about 12 to about 24 hours prior to dispersing the sol as droplets in the hot, water-immiscible, suspending medium as hereinafter described. The sol aging step has resulted in an improved yield of spheroidal chromia-alumina gel particles.

The chromia-alumina sol is suitably prepared in a diluted stated so as to contain from about 7 to about 15 wt. percent metals therein. The chromia-alumina sol with a metals concentration in excess of about 15 wt. percent thereof is substantially unstable and tends to set to a gel immediately upon being commingled with the aqueous HMT solution, or results in a spheroidal gel particle that is brittle and easily cracked. On the other hand, sols having a metals content of less than about 7 wt. percent yield soft hydrogel spheres generally unsuitable for further processing.

The dropping mixture is prepared to comprise from about 7 to about 10 wt. percent metals, and preferably from about 8 to about 10 wt. percent, by commingling a sufficient volume of an aqueous HMT solution with a chromia-alumina sol at below gelation temperature—usually a temperature of less than about 60° F. The HMT solution preferably comprises HMT in a concentration of from about 15 to about 40 wt. percent, the particular concentration being sufficient to provide an HMT/chloride mole ratio of from about 1:4 to about 1.25:4 in the dropping mixture, and to effect substantially complete neutralization of the chloride anion upon total hydrolysis of the HMT.

The dropping mixture thus prepared is thereafter formed into spheroidal chromia-alumina gel particles by the described oil-drop method. Pursuant to the present method, the spheroidal hydrogel particles thus prepared are aged, preferably in the oil suspending medium, at a pressure to maintain the water content of said particles in a substantially liquid phase and at a temperature to effect a substantially complete hydrolysis of the residual HMT contained therein. Substantially complete hydrolysis of the HMT occurs to form ammonia, amines and carbon dioxide within the temperature range of from about 240° to about 500° F., the temperature preferably not exceeding about 350° F. A temperature in the preferred range is suitably employed at a pressure of from about 40 to about 150 p.s.i.g., and sufficient to maintain the water content of the particles in a substantially liquid phase. The spheroidal gel particles are suitably aged at the described conditions of temperature and pressure within a period of from about 1 to about 5 hours.

After the aging treatment, the spheres are washed in any suitable manner. A particularly satisfactory method is to wash the spheres by percolation, either with an upward or downward flow of water, and preferably with water containing a small amount of ammonium hydroxide and/or ammonium nitrate. After washing, the spheres may be dried at a temperature of from about 200° to about 600° F. or dried at this temperature and calcined at a temperature of from about 800° to about 1400° F. for 2–12 hours or more, and then utilized as such or composited with other catalytic components. It is preferred that the spheres be dried slowly and also that the drying be effected in a humid atmosphere because this has been found to result in less breakage of the spheres.

The following example is presented in further illustration of the method and advantages of this invention and is not intended as an undue limitation on the generally broad scope of the invention as set out in the appended claims.

In the manufacture of a spheroidal chromia-alumina composite, 26.4 lbs. of chromium trioxide was dissolved in 19.06 lbs. of treated water and 14.1 lbs. of 32.5 wt. percent hydrochloric acid. To this solution was added 5.5 lbs. of 45.2 wt. percent aqueous formaldehyde solution, the addition being to a cooled reaction mixture, gradually and with stirring. Thereafter, an additional 10 lbs. of 32.5 wt. percent hydrochloric acid was added followed by an additional 5.5 lbs. of 45.2 wt. percent aqueous formaldehyde solution added slowly and with stirring. Another 2.1 lbs. of said formaldehyde solution was subsequently added to complete the reaction mixture. The final reaction mixture was heated at about reflux temperature for approximately 0.5 hour, and thereafter cooled to room temperature and aged over a 24 hour period. The resulting chromia sol, comprising 16.55 wt. percent chromia, was then blended with an alumina sol comprising 13.6 wt. percent alumina, and the sol blend aged for about 48 hours.

The aforesaid alumina sol was prepared by digesting 42.3 lbs. of aluminum pellets in hydrochloric acid and water to form a sol containing 13.6 wt. percent aluminum in a 1.38:1 weight ratio with the chloride content thereof. The aluminum pellets were charged to a digester followed by the addition of 171.85 lbs. of treated water and thereafter the slow addition of 97.12 lbs. of 32.5 wt. percent hydrochloric acid. The reactants were circulated in the digester while maintaining the temperature at about 215° F. until the digestion was substantially complete.

In a separate vessel, 195.74 lbs. of 28.93 wt. percent aqueous hexamethylenetetramine (HMT) solution was prepared and thereafter commingled with the aforesaid sol blend, the resulting mixture being maintained at about 45° F. The mixture thus prepared had a metals content (aluminum and chromium) of 9.5 wt. percent.

The described chromia-alumina sol blend preparation was repeated and commingled with various quantities and concentrations of aqueous HMT solutions to yield dropping mixtures comprising metals (aluminum and chromium) in concentrations of 7.2, 8.5, 9.0, and 9.2 wt. percent. Thus, the chromia-alumina sol blend was commingled with 383.88 lbs. of a 15.01 wt. percent aqueous HMT solution to form a dropping mixture comprising 7.2 wt. percent metals; 265.09 lbs. of a 21.74 wt. percent aqueous HMT solution to form a dropping mixture comprising 8.5 wt. percent metals; 228.44 lbs. of a 25.22 wt. percent aqueous HMT solution to form a dropping mixture comprising 9.0 wt. percent metals; and 215 lbs. of a 26.80 aqueous HMT solution to form a dropping mixture comprising 9.2 wt. percent metals.

The described dropping mixtures were separately emitted as droplets into a forming tower filled with a gas oil suspending medium maintained at about 205° F. Spherical gel particles were recovered from the bottom of the forming tower and aged in a portion of the oil suspending medium in a separate vessel for a period of 2.0 hours at a temperature of about 305° F. and at a pressure of 100 lbs. per square inch gauge. The aged spheres were thereafter washed with a flow of water charged to the vessel, 7 gallons of water per lb. of chromia-alumina being charged over 4.0 hours. The water-wash was at 200° F. and the effluent stream at a pH of 9.0. The spheres were thereafter recovered, dried for about 45 minutes at 185–270° F., and calcined 1 hour at 1000° F. and then at 1250° F. for 2 hours.

Following the calcination treatment at elevated temperature, the spheres were subjected to a standard test procedure to determine crushing strength. The average crushing strength of the chromia-alumina particles was determined as the arithmetic average of the force required to crush each particle of a given number of individual particles. Each particle was crushed in an apparatus constructed in such a manner that the force was applied continuously and at a uniform rate beginning with a zero load. The crushing strength apparatus consists essentially of a balance beam resting on a knife edge. The knife edge is located at unit distance from an anvil on which the chromia-alumina particle is placed. A cup, which receives lead shot by which the load is applied, is situated on the other side of the knife, four times the unit distance therefrom. This lead shot falls into the cup from a hopper at a rate of about 9 lbs. per minute, thus loading the chromia-alumina particles at a rate of about 36 lbs. per minute. A single particle is placed on the anvil of the apparatus, and the beam balance by means of a small spirit level. Force is applied to the particle by opening the shutter in the bottom of the hopper containing the lead shot, thus allowing the lead to flow in a continuous stream into the cup. The flow of lead shot is immediately and automatively cut off when the particle is completely crushed. The weight of lead shot within the cup is multiplied by a factor of 4 to give the actual crushing strength of the particle. The procedure is repeated 60 times and the crushing strength is taken as the arithmetic average of the observed individual crushing strengths.

The average bulk density (ABD) of the calcined spheres was determined by the standard method whereby the spheres are measured into a tared 100 cubic centimeter cylinder and the weight of said spheres is thereafter determined. The procedure is repeated 3 times and the average weight recorded. The ABD is reported as grams per cubic centimeter.

The crushing strength and ABD are recorded below in tabular form.

| Dropping mixture: metals content, wt. percent | 7.2 | 8.5 | 9.0 | 9.2 | 9.5 |
|---|---|---|---|---|---|
| Calcined gel particles: | | | | | |
| ABD, gms./cc. | 0.36 | 0.43 | 0.45 | 0.42 | 0.44 |
| Crushing strength, lbs. | 8.7 | 19.7 | 18.5 | 19.5 | 24.9 |

The attached drawing further illustrates the relationship between the metals content of the dropping mixture and the crushing strength of the spherical chromia-alumina particles prepared therefrom.

I claim as my invention:

1. A method for the manufacture of low density spherical chromia-alumina gel particles of improved crushing strength which comprises:
(a) preparing a chromia-alumina sol characterized by a metals/chloride mole ratio of from about 1:1 to about 1.5:1;
(b) preparing a dropping mixture by commingling said sol with an aqueous hexamethylenetetramine solution, the volume of said solution being sufficient to form a dropping mixture comprising from about 7 to about 10 wt. percent metals, and the hexamethylenetetramine concentration of each solution being sufficient to provide a hexamethylenetetramine/chloride mole ratio in said dropping mixture of from about 1.1:4 to about 1.65:4;
(c) dispersing the dropping mixture as droplets into a water-immiscible suspending medium maintained at a temperature of from about 120° to about 220° F. and retaining the droplets therein until they set to spherical gel particles;
(d) aging said gel particles and effecting substantially complete hydrolysis of the residual hexamethylenetetramine contained therein at a temperature of from about 240° to about 500° F., and at a pressure to maintain the water content of said particles in a substantially liquid phase, and washing and thereafter drying and calcining the aged particles.

2. The method of claim 1 further characterized with respect to step (a) in that said chromia-alumina sol is prepared by dissolving chromium trioxide in hydrochloric acid in an amount corresponding to from about 0.2 to about 2.0 moles of hydrochloric acid per mole of chromium trioxide and thereafter treating the solution in contact with a reducing agent and forming a chromia sol comprising chromium in the +3 valence state; digesting aluminum in an acid chloride selected from the group consisting of hydrochloric acid and aluminum chloride in aqueous solution, and forming an alumina sol, and; blending the chromia and alumina sols to provide a sol with a metals/chloride ratio of from about 1:1 to about 1.5:1.

3. The method of claim 2 further characterized with respect to step (a) in that said reducing agent is formaldehyde.

4. The method of claim 1 further characterized with respect to step (a) in that said chromia-alumina sol is aged for a period of at least about 24 hours prior to further processing in accordance with step (b).

5. The method of claim 1 further characterized with respect to step (b) in that the volume of said aqueous hexamethylenetetramine solution is sufficient to form a dropping mixture comprising from about 8 to about 10 wt. percent metals.

6. The method of claim 1 further characterized with respect to step (d) in that said gel particles are aged at a temperature not exceeding about 350° F. and at a pressure of from about 40 to about 150 p.s.i.g. whereby substantially complete hydrolysis of the residual hexamethylenetetramine is effected.

7. The spherical chromia-alumina gel particles manufactured according to the method of claim 1 and characterized by an average bulk density of from about 0.40 to about 0.5 gms./cc., and an average crushing strength of from about 15 to about 25 lbs.

References Cited

UNITED STATES PATENTS

| 2,620,314 | 12/1952 | Hoekstra | 252—448 |
| 3,114,720 | 12/1963 | Nixon | 252—448 |
| 3,202,480 | 8/1965 | Nixon | 252—448 X |
| 3,496,115 | 2/1970 | Vesely | 252—448 |

PATRICK P. GARVIN, Primary Examiner

U.S. Cl. X.R.

252—465